F. L. POPE.
Electric Circuits and Devices for Railway Signals.
No. 143,529. Patented Oct. 7, 1873.
2 Sheets--Sheet 1.
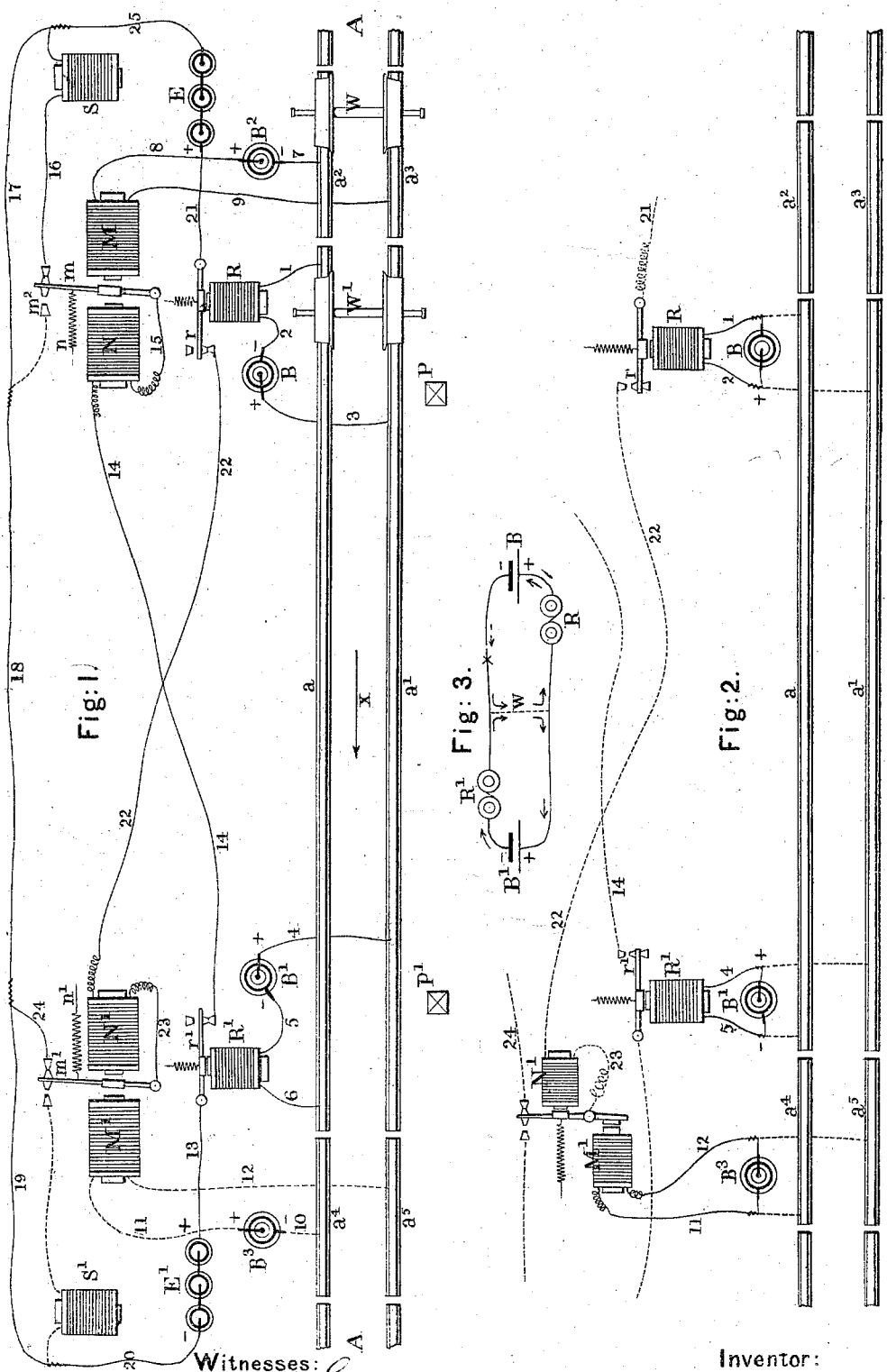
Witnesses:
Geo. H. Hamilton
Edwin Eagles
Inventor:
Frank L. Pope

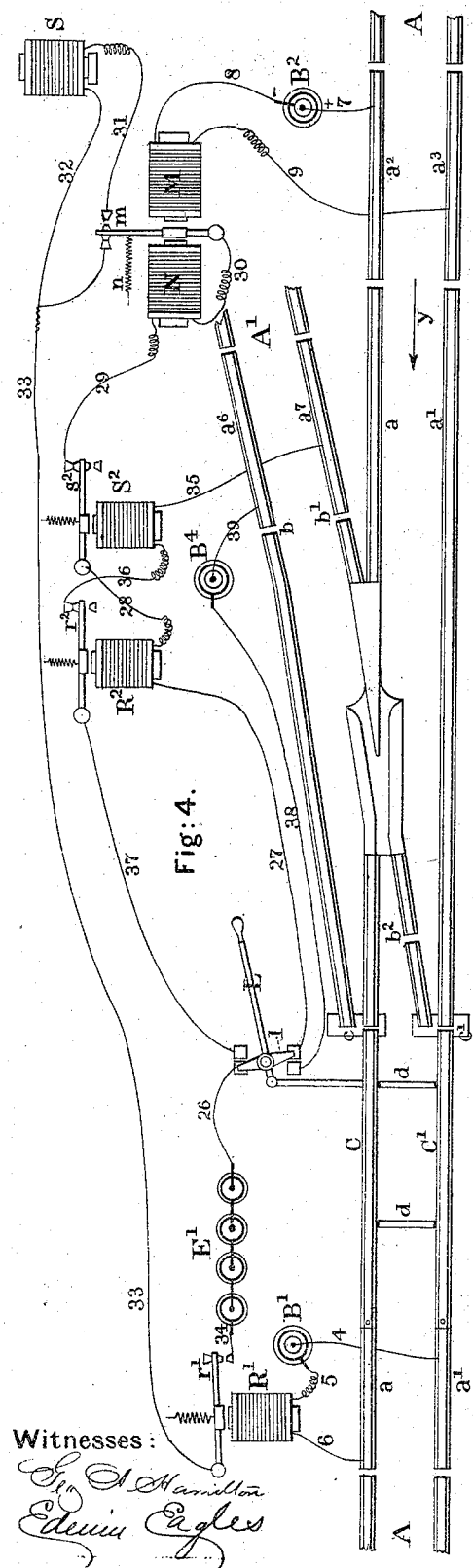

UNITED STATES PATENT OFFICE.

FRANK L. POPE, OF ELIZABETH, NEW JERSEY.

IMPROVEMENT IN ELECTRIC CIRCUITS AND DEVICES FOR RAILWAY-SIGNALS.

Specification forming part of Letters Patent No. 143,529, dated October 7, 1873; application filed June 11, 1873.

*To all whom it may concern:*

Be it known that I, FRANK L. POPE, of Elizabeth, in the county of Union and State of New Jersey, have invented certain new and useful Improvements in Electric Signaling Apparatus for Railroads; and I do hereby declare that the following is a full, clear, and exact description thereof, reference being had to the accompanying drawings, which form part of this specification.

My invention relates to that class of electrical signaling apparatus which is operated in connection with insulated sections of railroad-track, and in which the electric circuits controlling the signal-operating magnets are brought into action whenever the rails of the said insulated section of track are bridged or connected by the wheels and axles of a locomotive or train; and it consists principally in certain novel combinations and arrangements of batteries, circuits, and circuit-closers or circuit-breakers with the signal-operating magnet or magnets, so that a safety-signal, either audible or visual, will be given to the engineer of an approaching locomotive or train when that portion of the track between the point at which said signal is located and the next signaling-point in advance thereof is unobstructed; and in providing means and appliances whereby the obstruction of the said portion of the track in advance—by a locomotive or car moving in either direction or at rest, the removal of a rail, the displacement of a switch or draw-bridge, or the failure of the wires or batteries to perform their proper functions—will absolutely prevent the safety-signal from being given. My invention further consists in a method of securing the proper insulation of the rails of a railroad-track (when used as electrical conductors) at the intersection of a siding or branch track.

In the accompanying drawings, Figure 1 is a diagram, showing the application of my invention to a single-track railroad, and Fig. 2 is a modification of the same. Fig. 3 is a diagram, showing more clearly the arrangement of the circuits and batteries in Fig. 1. Fig. 4 is a diagram, showing the application of my invention to a double-track railroad, and also to the point of intersection of a branch or siding. Figs. 5, 6, and 7 are detached views, showing the manner in which the rails of the track are insulated at the point of intersection of a branch track or siding.

Referring to Fig. 1, A A is a railroad-track divided into insulated sections, in a manner fully described in my former United States Letters Patent, No. 129,425, dated July 16, 1872, and which, therefore, requires no detailed description herein. Each of the two lines of rails, $a$ and $a^1$, forms a continuous electrical circuit of, say, a mile in length, more or less. Adjacent to each end of the last-mentioned section shorter insulated sections, $a^2$ $a^3$ and $a^4$ $a^5$, are provided, which need not ordinarily be more than about fifty feet, more or less, in length. A suitable galvanic battery, B, and relay-magnet R, are connected to one end of the insulated section $a$ $a^1$ by means of wires or conductors 1 2 3. In like manner a second battery, $B^1$, and relay-magnet $R^1$, are connected to the opposite end of the same lines of rails by conductors 4 5 6. It will thus be understood by reference to Fig. 1 that a complete circuit is formed, as follows: From rail $a$, through wire 1, relay R, wire 2, battery B, wire 3, rail $a^1$, wire 4, battery $B^1$, wire 5, relay $R^1$, and wire 6, the latter being again in connection with rail $a$. By reference to Figs. 1 and 3 it will be understood that the two batteries B and $B^1$ are placed with like poles opposed to and neutralizing each other, and that there will, therefore, ordinarily be no electric current whatever manifested in this circuit. This arrangement of batteries is shown clearly in the diagram, Fig. 3. The batteries being opposed to each other in this manner, the relays R and $R^1$ will not be operated until an electrical connection is formed at some point between $a$ and $a^1$—as by the wheels and axle $W^1$ of a locomotive or car—when two circuits will be formed, as indicated by the dotted line $w$ and the arrows in Fig. 3, and both relays R and $R^1$ will be operated simultaneously. To the shorter insulated section of track $a^2$ $a^3$ another relay-magnet, M, and battery $B^2$ are connected by means of wires or conductors 7 8 9, so that the circuit will be completed and the relay operated whenever the rails $a^2$ and $a^3$ are connected by the wheels and axles of a locomotive or car. A corresponding relay, $M^1$, and battery $B^3$ are connected in like manner to the other short insulated section of track $a^4$ $a^5$, by means of conductors 10 11 12. In lieu of the short insulated sections of track $a^2$ $a^3$ and $a^4$ $a^5$ any other form of circuit-closer may be used, provided it is so arranged as to keep the circuit closed until the locomotive or train has entered upon the insulated section $a$ $a^1$. S and $S^1$ are electro-magnets, which are arranged to actuate or control visual or audible signals, guarding each end of the section of track $a$ $a^1$. These signals may be of any suitable construction, such, for example, as shown and described in my United States Patent No. 130,941, dated August 27, 1872, or they may be actuated by mechanism, and the movement of the mechanism controlled by the magnets S or $S^1$. In any case, they should preferably be so constructed and arranged that when the magnet S or $S^1$ becomes operative a safety-signal will be exhibited or sounded, while the signal at all other times will denote "danger" or "caution."

The route of the electric current which actuates the magnet S is as follows: From the positive or + pole of the battery $E^1$ by wire 13, relay-lever $r^1$, wire 14, retaining-magnet N, wire 15, relay-lever $m$, and wire 16, returning by wires 17, 18, 19, and 20, to the negative or — pole of the battery $E^1$. Thus it will be understood that in order to actuate the signal-operating magnet S it is necessary that its circuit should be closed both at $m$ and at $r^1$, as shown in the drawing, Fig. 1. The circuit of the other signal-operating magnet $S^1$ may be traced to and from the battery E in precisely the same manner.

The operation of the apparatus is as follows: Suppose a train, represented by W, is moving in the direction indicated by the arrow $x$. It will first complete the circuit between $a^2$ and $a^3$, actuating the relay M, and thereby closing the secondary circuit at $m$. It will next close the circuit, or make a connection between $a$ and $a^1$, as seen at $W^1$, which, as hereinbefore explained, will operate both relays R and $R^1$. As the circuit between $a^2$ and $a^3$ still remains closed by means of the wheels and axles of the succeeding portion of the locomotive or train, the circuit of the signal-operating magnet S will now be finally completed at $r^1$ by the action of the relay $R^1$, and a safety-signal will be given, permitting the locomotive or train to proceed. If, however, any portion of the line of rails $a$ or $a^1$ should be accidentally or purposely broken or removed, the closing of the circuit or making connection at $W^1$ would not actuate the relay $R^1$, and consequently no safety-signal could be given. It is obvious that this would also be the case if any of the wires or conductors were interrupted or the batteries inoperative.

In order to prevent any possibility of a train being permitted (by means of a safety-signal) to start in the opposite direction to enter upon the track $a$ $a^1$ when occupied as above described, I have applied a retaining-magnet, N, which operates as follows: When the circuit is closed at $W^1$ the relay R is operated, as hereinbefore explained. This closes a circuit at $r$, proceeding from the battery E through wire 21, relay-lever $r$, wire 22, and retaining-magnet $N^1$, returning through wire 23, relay-lever $m^1$, wires 24, 18, 17, and 25. The retaining-magnet $N^1$ being thus brought into action, if a train coming in the opposite direction should close the circuit at $a^4$ $a^5$, the relay-magnet $M^1$ would not be able to pull its armature away from the attraction of $N^1$ in order to operate the safety-signal by means of the magnet $S^1$ as long as the section of track $a$ $a^1$ is occupied by another train. In like manner, after the train W $W^1$ has passed beyond the insulated section $a^2$ $a^3$, the armature-lever $m$ will be released by the magnet M, and drawn over by the spring $n$, closing circuit at $m^2$, and directing the current through the helices of the retaining-magnet N. If, now, a following train should complete the circuit at $a^2$ $a^3$, the relay-magnet M would be prevented, by the attraction of N, from closing the secondary circuit so as to operate the signal magnet S. A post, P or $P^1$, is placed at the side of the track, at a point which will be reached by the locomotive soon after entering upon the insulated section $a$ $a^1$, and no locomotive should be permitted to proceed beyond the said post until the safety-signal has first been given by the magnet S. If such safety-signal is not given, it is a warning either that the track $a$ $a^1$ is occupied by another train, that a rail has been broken or removed, or that the wires and batteries are not in proper working order.

Fig. 2 shows a modification of the hereinbefore-described arrangement, in which similar letters of reference denote like parts. In this modification, the batteries B $B^1$ $B^3$, &c., are connected and arranged in such a manner as to form a constant circuit through their respective magnets, which circuit is "shunted" by the passage of a locomotive or train, so as to demagnetize the magnets of the relays, the signals being otherwise operated in the manner hereinbefore explained. It is also necessary, in this case, to so arrange the batteries B and $B^1$ that they will neutralize each other, except when a connection is formed between the rails $a$ and $a^1$.

Fig. 4 shows the application of my invention to a double-track railroad, on which the trains run in one direction only, and also the arrangement employed at the intersection of a branch track or siding, the general principle being similar to that of the apparatus hereinbefore explained.

Suppose a train to be moving in the direction indicated by the arrow $y$. It will first close the circuit between $a^2$ and $a^3$, and afterward between $a$ and $a^1$. When both relays M and $R^1$ are thus simultaneously operated, the safety-signal will be given by the action of the magnet S, the circuit of the latter being completed from the battery $E^1$ through wire 26, circuit-changer $l$, wire 27, relay-magnet $R^2$, wire 28, armature-lever $s^2$, wire 29, retaining-magnet N, wire 30, relay-lever $m$, and wire 31, returning through wires 32 and 33, relay-lever $r^1$, and wire 34. The branch track or siding $A^1$ is also provided with a safety-signal, operated or controlled by the magnet $S^2$, either directly or through the intervention of a local circuit. The operating-circuit of the magnet $S^2$ includes a battery, $B^4$, and is closed by the passage of a locomotive or car over the insulated section of track $a^6$ $a^7$.

This circuit may be traced as follows: From rail $a^7$ through wire 35, magnet $S^2$, wire 36, relay-lever $r^2$, wire 37, circuit-changer $l$, and wire 38, to battery $B^4$, and thence by wire 39 to the other rail $a^6$. By an inspection of Fig. 4 it will be understood that the magnet $S^2$, which controls the safety-signal of the branch-track, cannot be operated unless the switch is adjusted in line with the rails of the branch-track $A^1$, so as to form a connection between the wires 37 and 38, by means of the circuit-changer $l$; neither can it be operated if another train is occupying any portion of the insulated section of track $a$ $a^1$, for in that case the circuit would be broken at $r^2$ by the relay $R^2$. Similarly if the switch-rails are adjusted in line with the branch track $A^1$, or if a train is standing upon or passing over the insulated section of track $a^6$ $a^7$ toward the main track, the circuit of the signal-magnet S will be broken at $l$, or else at $S^2$, so that no safety-signal can be given by the action of the magnet S.

In order to carry the circuit of the rails $a$ and $a^1$ through the switch without any metallic connection being formed from one rail to the other, the rails of the branch track are divided and suitably insulated at $b$, $b^1$, and $b^2$. The movable rails $C$ $C^1$ of the switch are electrically connected with the fixed rails by the metallic plates $c$ $c^1$, upon which the abutting ends are supported, thus rendering the circuit through the main rails continuous.

Fig. 7 shows another method of preserving the continuity of the circuit through the lines of rails forming the main track, at the point of intersection of a branch or siding. The metallic continuity of both rails is broken at the points $k$, $k^1$, $k^2$, and $k^3$. It will be observed that $k$ and $k^1$ are situated beyond the fulcrums of the movable rails $C$ $C^1$ in one direction, and $k^2$ and $k^3$ beyond the "frog" in the other direction. Suitable metallic conductors $D$ $D^1$ are then connected to the severed ends of the insulated lines of rails $A^2$ $A^3$, by means of which the current is enabled to pass around the switch without interference. The movable rails $C$ $C^1$ are usually connected together by means of metallic bars or ties $d$ $d$, Fig. 4. When the track is arranged in the manner shown in Fig. 4, it is necessary that these should not form a metallic connection through which the electric current might pass between the rails $C$ and $C^1$. I therefore make use of a metallic bar or tie, as at $d$, Fig. 5, which is insulated from the rails $C$ $C^1$, by the interposition of plates of some suitable non-conducting material $f$ $f^1$, one or both. The same effect may be produced by the use of a wooden bar, H, the metallic bar $d$ being divided in the middle, and the parts secured to the wooden bar by means of bolts or otherwise, as clearly shown in Fig. 6.

I do not claim, by itself, the method of operating a signal by means of a constant circuit, which is shunted out of the operating-magnet by means of a connection formed by the wheels and axles of a locomotive or car, as shown in Fig. 2, except when combined with the devices and arrangements herein shown and described.

I claim as my invention—

1. The combination of the following elements: Two batteries, B and $B^1$, so arranged as to oppose and neutralize each other, included in the same circuit, and placed at opposite ends of a section of railroad-track, one or more electro-magnets, S $S^1$, for actuating or controlling one or more visual or audible signals, and a circuit-closer, W or $W^1$, arranged to bring the said batteries simultaneously into action, and thereby cause said electro-magnet or magnets to operate said signal or signals, substantially as and for the purpose herein specified.

2. The combination, with the rails of a railroad-track, of two galvanic batteries, B $B^1$, arranged to neutralize each other until metallic connection is formed between the said rails, when two independent circuits will be established, substantially as and for the purpose specified.

3. The combination of the following elements: An insulated section of railroad-track, a relay, $R^1$, placed at or near one end of said insulated section of track, a secondary circuit controlled by said relay, and a magnet, S, situated at or near the opposite end of said insulated section of track, and arranged to operate or control the operation of a visual or audible signal, or both, substantially as and for the purpose herein specified.

4. The combination of the following elements: The battery $E^1$, signal-operating magnet S, circuit of conductors 13, 14, 15, 16, 17, 18, 19, and 20, and two independent circuit-closers, $m$ and $r^1$, each under the control of a locomotive or train, the whole being so arranged that the magnet S can only be operated by the simultaneous action of both circuit-closers, substantially as specified.

5. The combination of the following elements: The insulated section of track $a^2$ $a^3$, the battery $B^2$, the relay M, the retaining-magnet N, and the insulated section of track $a$ $a^1$, substantially as herein specified.

6. The combination of the movable rails of a switch with the double-acting circuit-changer $l$ and the electro-magnets S and $S^2$, arranged to operate or control the operation of visual or audible signals, or both, substantially as herein specified.

7. The signal-operating magnet S, battery $E^1$, and circuit of conductors 26, 27, 28, 29, 30, 31, 32, and 33, in combination with the circuit-changer $l$ and the circuit-breaker $S^2$, (either or both,) substantially in the manner and for the purpose specified.

8. The insulated section of track or other circuit-closer $a^6$ $a^7$, signal-operating magnet $S^2$, and battery $B^4$, in combination with the circuit-changer $l$ and circuit-breaker $r^2$, (either or both,) substantially in the manner and for the purpose specified.

9. The combination of the insulated section of track $a$ $a^1$ with a branch track or siding, insulated for a proper distance by means of breaks $b$ $b^1$, or otherwise, for the purpose of confining the electric circuit to the main track, substantially as and for the purposes herein specified.

10. The combination of the insulated section of track $a$ $a^1$, with a branch track or siding, provided with an insulating break, $b^2$, for the purpose of preventing an electrical connection between the opposite lines of rails of the said insulated section, substantially as herein specified.

11. The combination of the insulated sections of railroad-track $A^2$ and $A^3$ with the electrical conductors D or $D^1$, (either or both,) substantially as and for the purpose specified.

FRANK L. POPE.

Witnesses:
GEO. A. HAMILTON,
EDWIN EAGLES.